W. B. GRAY.
CONDUIT.
APPLICATION FILED JULY 11, 1917.
1,313,179.
Patented Aug. 12, 1919.
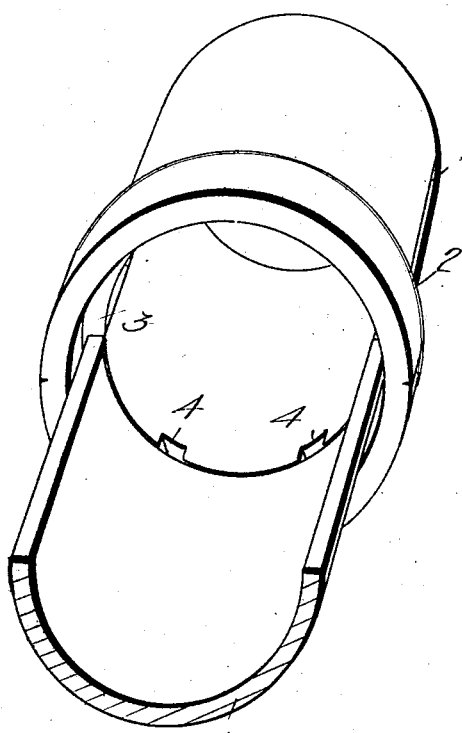
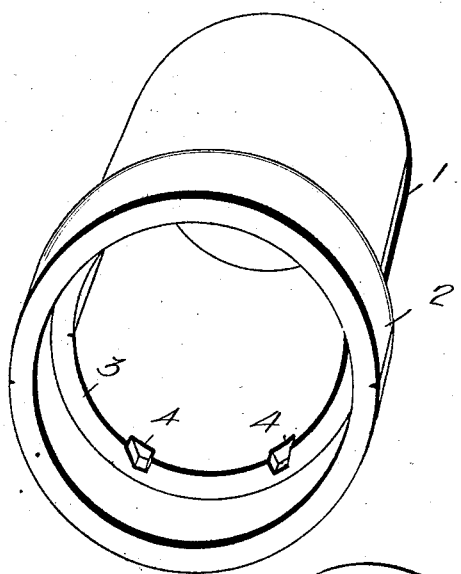
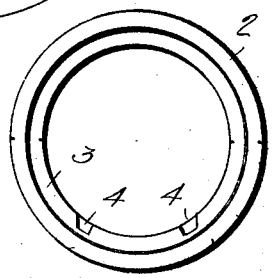
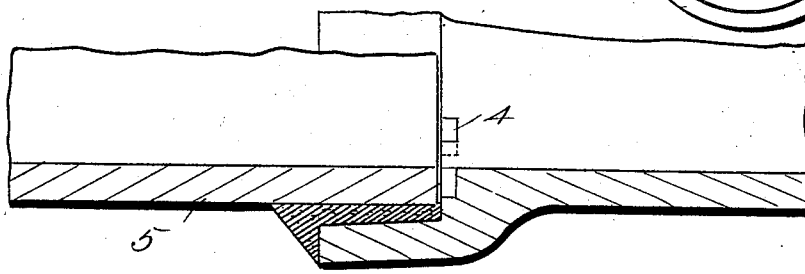
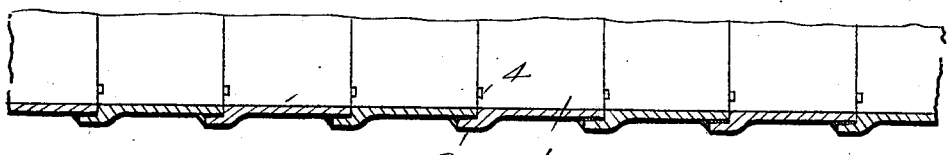
WITNESSES
H. C. Barry
INVENTOR
William B. Gray
BY
Munn & Co
ATTORNEYS

UNITED STATES PATENT OFFICE.

WILLIAM BEALL GRAY, OF LOUISVILLE, KENTUCKY.

CONDUIT.

1,313,179.  Specification of Letters Patent.  Patented Aug. 12, 1919.

Application filed July 11, 1917. Serial No. 180,003.

*To all whom it may concern:*

Be it known that I, WILLIAM B. GRAY, a citizen of the United States, and a resident of Louisville, in the county of Jefferson and State of Kentucky, have invented new and useful Improvements in Conduits, of which the following is a specification.

My invention is an improvement in conduits of the character used for supporting and insulating heating pipes liable to expansion and contraction, and in which the pipes are laid wherein anchored supports are provided for the pipes, and the invention has for its object to provide a new and improved form of anchoring means in connection with the conduit sections for anchoring the supports which anchoring means may be machine molded, without difficulty or extra cost, when the conduits are formed.

In the drawings:

Figure 1 is a perspective view of a conduit length looking at the bell end, and with the adjacent length in section;

Fig. 2 is a perspective view of the conduit length looking at the bell end, and showing the full depth and shape of the anchor recesses;

Fig. 3 is an end view;

Fig. 4 is a partial vertical section through two lengths;

Fig. 5 is a similar view through a number of lengths.

In the present embodiment of the invention, the conduit is formed of lengths 1 of cylindrical form, each having a bell 2 at one end, for receiving the adjacent end of the succeeding length. An annular shoulder 3 is provided between the bell and the body of the length, and the succeeding length abuts against this shoulder which has a transverse depth or width corresponding to the thickness of the conduit wall plus the thickness of the joint space.

The invention consists in providing machine molded recesses 4 in this shoulder 3, the said recesses having their adjacent walls radial to the conduit and having their outer walls inclined, as shown, and the said notches are of sufficient depth to permit the entrance of holding lugs on the pipe support to provide a firm anchorage for the fixed portion of the pipe support. These recesses have an inner wall, two end walls and a bottom wall, the outer or other side wall being formed by the abutting end of the adjacent conduit section 5. Thus when the conduit lengths are laid as shown in Fig. 5, at points between each pair of adjacent sections, there are provided two recesses 4 for receiving lugs or projections from the fixed portion of the pipe support.

The recesses are so placed that when the lengths are laid the recesses will be on opposite sides of the center of the conduit and at equal distances from the vertical plane through the center of the conduit. These recesses may be formed during the molding of the socket end of the conduit, without adding any expense to the construction, by properly arranging part of the die which molds the conduit socket end.

Since the anchoring recesses or notches are machine made in the molding of the conduit section socket or bell ends, the errors of hand work are eliminated, as is also the cost, and thus is secured absolute uniformity in the dimensions and shape of the anchor recesses, with the result of lower cost of manufacture, more expeditious installation and a better adjustment of supports. There is also a better distribution of the weight of the pipe or pipes carried by the conduit. By providing these anchorages in each conduit length, there is eliminated the necessity of special lengths of conduit carrying anchoring means for pipe supports. Since every conduit length is the same, every length is a supporting length for the pipe supports. There is eliminated, with the improved anchorage, the necessity of predetermining the location of pipe supports. This is true because every length or section is a pipe supporting section with anchorages; hence no other kind of section or length in any line of conduits is necessary.

With special conduit lengths carrying supports, if a length is omitted for any reason, there would be occasion to tear out or relocate the supporting lengths. This is not true with the present construction, since every section or length can be used for anchoring a pipe support. In addition, should a pipe coupling or flange fall at or too near the pipe support the support may be removed to another length immediately adjacent.

I claim:

In a conduit, a series of leaves, each having at one end a bell or socket and having in the shoulder formed between the bell and the body of the length indentations extending from the outer face of the shoulder longitudinally of the length and opening radially inward into the interior of the conduit and at the shoulder, said indentations being adapted to be closed at the face of the shoulder by the abutting or spigot end of the succeeding length.

WILLIAM BEALL GRAY.